United States Patent [19]

Yamazaki et al.

[11] 4,341,134
[45] Jul. 27, 1982

[54] TOOL FOR STRIPPING INSULATING COVERING

[75] Inventors: Shigeo Yamazaki, Suzuka; Masahiko Nakamura, Matsuzaka, both of Japan

[73] Assignee: MCC Corporation, Tsu, Japan

[21] Appl. No.: 176,631

[22] Filed: Aug. 8, 1980

[30] Foreign Application Priority Data

Oct. 9, 1979 [JP] Japan ................................. 54-130273
Oct. 9, 1979 [JP] Japan ................................. 54-140084[U]
Oct. 9, 1979 [JP] Japan ................................. 54-140085[U]
Oct. 9, 1979 [JP] Japan ................................. 54-140086[U]
Oct. 9, 1979 [JP] Japan ................................. 54-140087[U]
Oct. 9, 1979 [JP] Japan ................................. 54-140088[U]
Oct. 9, 1979 [JP] Japan ................................. 54-140089[U]

[51] Int. Cl.³ ............................................. H02G 1/12
[52] U.S. Cl. ................................................... 81/9.5 A
[58] Field of Search ............ 30/90.1; 81/9.5 R, 9.5 A, 81/9.5 B

[56] References Cited

U.S. PATENT DOCUMENTS

| 2,659,254 | 11/1953 | Wood | 81/9.5 A |
| 3,125,908 | 3/1964 | Rozmus | 81/9.5 A |
| 3,146,645 | 9/1964 | Hindenburg et al. | 81/9.5 A |
| 3,383,959 | 5/1968 | Weglin | 81/9.5 A |
| 3,543,616 | 12/1970 | Bradley | 81/9.5 R |
| 3,596,541 | 8/1971 | Bieganski | 81/9.5 A |

Primary Examiner—James G. Smith
Attorney, Agent, or Firm—Wenderoth, Lind & Ponack

[57] ABSTRACT

There is disclosed a tool for stripping the insulating covering from a covered electrical wire which comprises one handle pivoted by means of a shaft to the other handle having a lower jaw at the leading end portion thereof and in which the leading portion of the main body of the tool has an electrical wire holding mechanism adapted to grip the wire upon closing of the two handles and cutting blades adapted to cut into and pull the cut insulator covering off of the core of the wire in the longitudinal direction of the handles upon the closing of the handles. The electrical wire holding mechanism and cutting blades project laterally of the handles.

9 Claims, 5 Drawing Figures

1

TOOL FOR STRIPPING INSULATING COVERING

BACKGROUND OF THE INVENTION

This invention relates to a tool for stripping the insulator covering formed of an insulative material such as rubber or vinyl chloride from a covered electrical wire.

The conventional tool of this type used for stripping insulating coating from covered electrical wires comprises an electrical wire holding mechanism consisting of upper and lower jaws at the leading ends of a pair of handles pivoted to each other for opening and closing and a pair of upper and lower cutting blades movable to cut into the insulator coating on the wire and then strip the cut insulator coating from the wire core. Such type of insulator coating stripping tools are disclosed in U.S. Pat. Nos. 3,125,908 and 3,146,645, for example. However, the tools as disclosed in the abovementioned U.S. patents have the disadvantage that since the upper and lower jaws and the upper and lower cutting blades are positioned in substantially the same plane as the handles lie, the leading end of the wire gripped by the two jaws and nipped by the two cutting blades is interrupted by the handles and therefore, the length of a covered electrical wire from which the insulator coating is to be removed is limited and the insulator coating covering the covered electrical wire cannot be stripped off for a substantial distance along the length of the core wire.

And the prior art tools also have the disadvantage than when the insulator coating is stripped off the covered electrical wire, the wire gripped between the upper and lower jaws is frequently displaced inadvertently and the cutting position on the insulator coating varies resulting in improper stripping of the insulator coating. Furthermore, the prior art tools have the disadvantage that since such tools include a mechanism adapted to move the two cutting blades in the axial direction of the wire and the upper and lower jaws are formed as parts separate from the handles, the construction is complicated and not compact and does not have sufficient rigidity. Furthermore, since the prior art tools are designed for use with only a covered solid wire, the tools cannot strip the sheath from a flattened covered electrical wire including a plurality of covered core wires.

SUMMARY OF THE INVENTION

Therefore, one object of the present invention is to provide a tool for stripping the insulator coating from a covered electrical wire in which the insulator coating stripping operation is not interrupted by the handles whereby the insulator coating can be stripped from the core wire for a substantial distance along the length of the core wire.

Another object of the present invention is to provide a tool for stripping the insulator coating from a covered electrical wire in which when the insulator coating is to be stripped from the covered electrical wire, the tool is positively prevented from slipping from the cutting position on the insulator coating to thereby ensure cutting-off the proper length of insulator coating.

Another object of the present invention is to provide a tool for stripping the insulator coating from a covered electrical wire which has a simple and compact but rigid mechanism.

Another object of the present invention is to provide a tool for stripping the insulator coating from a covered electrical wire which can be simply operated.

Another object of the present invention is to provide a tool for stripping the insulator coating from a covered electrical wire which is easily adaptable for stripping a covered electrical wire of the insulator coating and also for stripping the sheath from a flattened covered electrical wire including a plurality of covered wire cores.

According to the present invention, a tool is provided for stripping the insulator covering from a covered electrical wire in which the main body of the tool comprises a first handle having a lower jaw at the leading end and a second handle pivoted to the first handle by means of a shaft and a wire holding mechanism adapted to grip the wire upon closing of the two handles and cutting blades adapted to cut into the insulator covering on the covered electrical wire and pull the cut insulator covering off of the core wire along the length of the handles upon the closing of the handles are provided at the leading end portion of the main body projecting laterally of the handles.

The above and other objects and attendant advantages of the present invention will be more readily apparent to those skilled in the art from a reading of the following detailed description in conjunction with the accompanying drawings which show one preferred embodiment of the invention for illustration purpose only, but not for limiting the scope of the same in any way.

DETAILED DESCRIPTION OF THE PREFERRED EMBODIMENTS

The present invention will be now described by way of the accompanying drawings which show the preferred embodiment of the tool.

Figure 1:
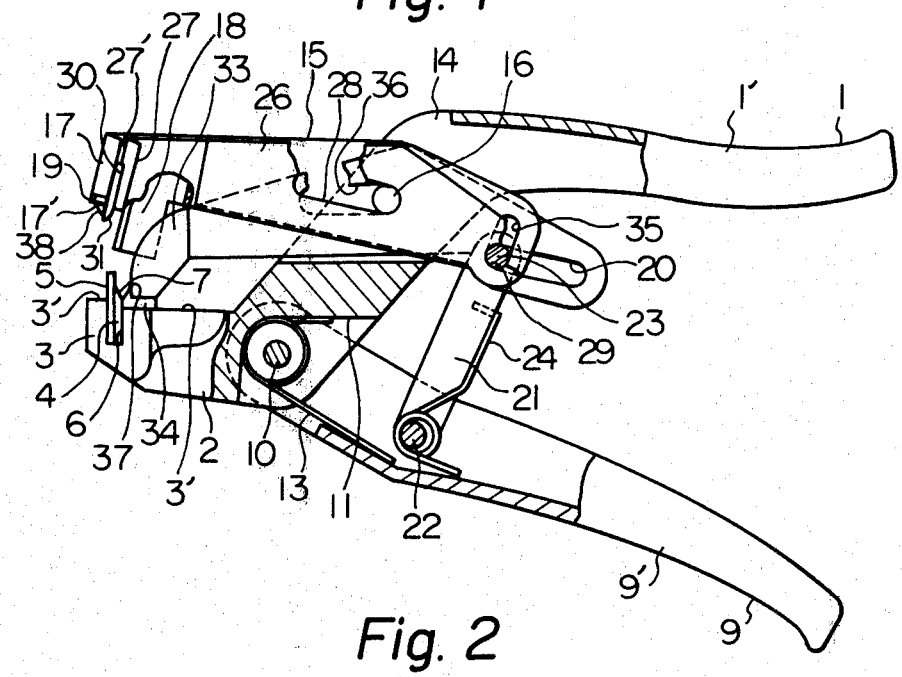
FIG. 1 is a side elevational view of one embodiment of the invention showing the tool for stripping the insulating covering from a covered electrical wire with a portion thereof broken away.
Figure 2:
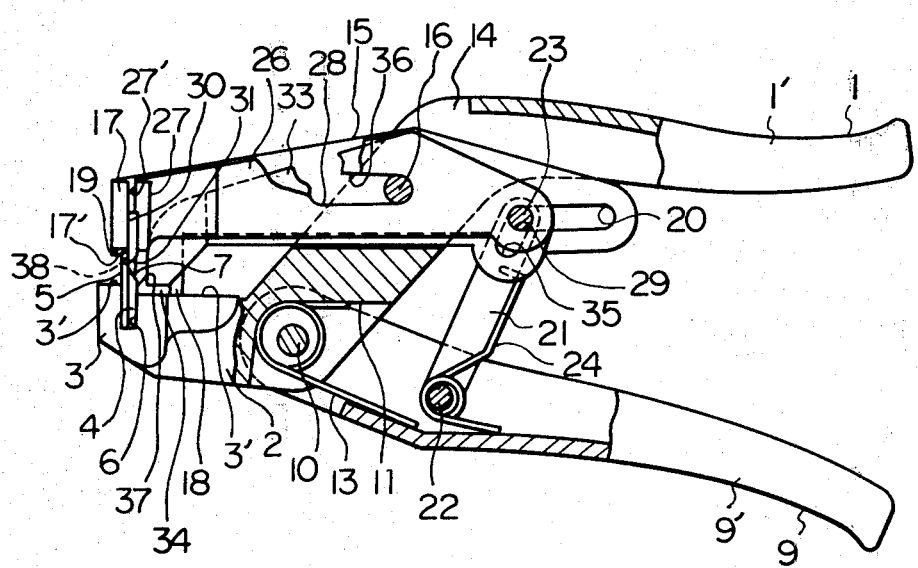
FIG. 2 is similar to FIG. 1, but shows the upper cutting blade and the associated stripping blade in their lowered position.
Figure 3:
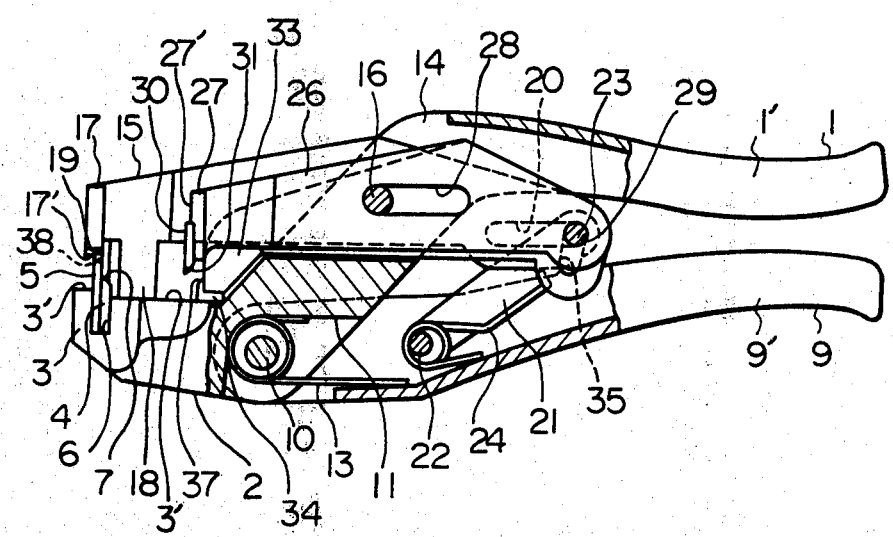
FIG. 3 is similar to FIG. 2, but shows the associated stripping blade in its stripping position.
Figure 4:
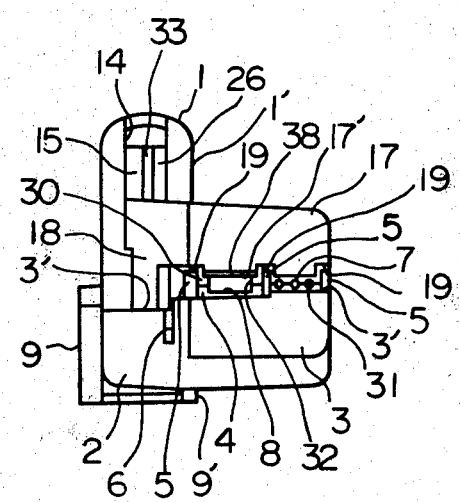
FIG. 4 is an end elevational view of the tool in its condition as shown in FIG. 3.
Figure 5:
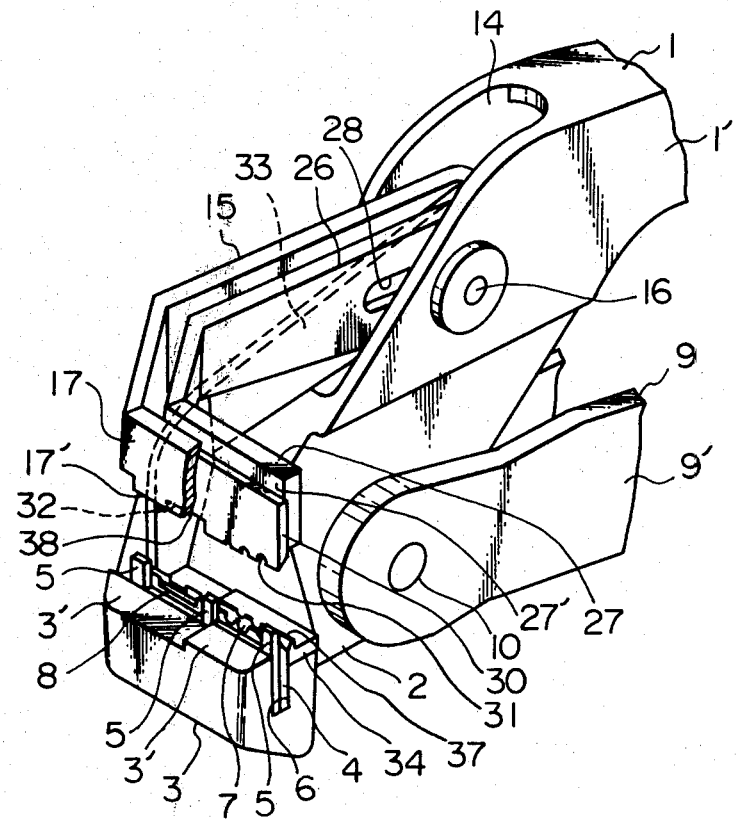
FIG. 5 is a perspective view of the tool as shown in FIG. 1 with a portion thereof broken away.

In FIGS. 1 and 5, reference numeral 1 denotes an upper handle of U-shaped cross-section having a lower jaw 2 integral with the leading end of the handle and the lower jaw has at the leading or free end thereof a lower holding portion 3 extending from the forward end of the lower jaw 2 and also projecting laterally of one surface 1' of the upper handle 1 and one surface 9' of a lower handle 9 of U-shaped cross-section. The upper surface 3' of the holding portion 3 is provided with a groove 6 in which the roots of a lower cutting blade 4 and a plurality of guides 5 are held in position. Thus, the lower cutting blade 4 and guides 5 are also positioned for projecting laterally of the surfaces 1', and 9' of the upper and lower handles 1 and 9, respectively. A portion of the lower cutting blade 4 on one side thereof is provided with one or more arcuate blade edges 7 (each blade edge 7 is adapted to cut into the insulating covering on a covered solid wire) and another portion of the lower cutting blade on the other or opposite side thereof is formed with a blade edge 8 in the form of an elongated recess having the depth greater than that of the arcuate blade edges 7. The blade edge 8 has a flattened bottom and is adapted to cut into the insulating covering of a flattened covered electrical wire such as a flattened vinyl sheathed cable. The guides 5 are secured to one or the outer end of the outermost arcuate blade edge 7, one or the outer end of the blade edge 8 and the boundary between one or the outer end of the innermost arcuate blade edge 7 and the other or inner end of the blade edge 8, respectively, in the illustrated embodiment. The leading end of the lower handle 9 is pivoted by means of a stub shaft 10 to the intermediate position of the upper handle 1 where the rear end of the lower jaw 2 is positioned. Disposed about the stub shaft 10 is a return spring 13 having one end abutting against a groove 11 formed in the middle portion of the upper handle 1 and the other end abutting against the inner surface of the U-shaped lower handle 9. Reference numeral 14 denotes an elongated guide opening formed in substantially the central portion of the length of the upper handle 1 and a guide member 15 is received in the guide opening 14 and is pivoted in substantially the central portion thereof to the upper handle 1 by means of a transverse bolt 16. Provided at the leading end of the guide member 15 is an upper holding portion 17 which projects laterally of the surfaces 1' and 9' of the upper and lower handles 1 and 9, respectively like the lower holding portion 3. The upper holding portion 17 is adapted to move toward the lower holding portion 3 as the lower handle 9 is pivoted in the direction toward the upper handle 1 as will be described hereinafter. The undersurface 17' of the upper holding portion 17 faces the upper surface 3' of the lower holding portion 3 and thus the surfaces 17' and 13' of the upper and lower holding portions 17 and 13 provide an electrical wire holding mechanism which clamps the wire as the lower handle 9 approaches the upper handle 1. A stop member 18 is integrally formed on one side of the upper holding portion 17 and projects downwardly a small distance from the undersurface 17' of the holding portion 17 (FIGS. 1 and 4). The stop member 18 functions to limit the pivotal movement of the guide member 15 as the guide member pivots about the axis of the bolt 16 in the counter-clock-wise direction as seen in FIGS. 1 to 3 inclusive by means of an interlocking rod 21, the description of which will be given hereinafter, when the upper and lower handles 1 and 9 are closed and when the guide member has pivoted by a predetermined angular distance in the counter-clockwise direction, the lower end of the stop member 18 abuts against the upper surface 3' of the lower holding portion 3 to prevent the guide member 15 from further pivoting. The undersurface 17' of the upper holding portion 17 is provided with recesses 19 for receiving the upper ends of the guides 5 during the insulating covering stripping operation. An anti-slip member 38 is securely provided on the holding portion along the front surface of an upper cutting blade 30 the description of which will be given hereinafter. The anti-slip member 38 has a pointed leading edge which is adapted to abut against the cut end edge of the insulating covering remaining on the electrical wire when, after the cooperating lower and upper blades 4 and 30 cut into the insulating covering, the upper blade 30 is moved so as to remove the coating from the wire. Instead of providing such the anti-slip member 38 on the holding portion 17, serrations can be provided on the undersurface 17' of the upper holding portion 17 and on the upper surface 3' of the lower holding portion 3 for preventing the electrical wire from slipping off.

The rear portion of the above-mentioned guide member 15 is provided with a slot 20. Reference numeral 21 denotes a connector rod which is pivoted at the lower end to the lower handle 9 in substantially the central portion of the latter by means of a stub shaft 22 and is also pivotably supported on a pin 23 loosely received in the slot 20 in the guide member 15. By the provision of the connector rod 21 in the manner described above, the guide member 15 is pivotably connected to the lower handle 9 by the connector rod 21. Disposed about the pin 22 is a spring 24 which has one end abutting against the inner surface of the lower handle 9 and the other end abutting against the connector rod 21 whereby a resilient force acts on the rod 21 in the counter-clockwise direction as seen in FIGS. 1 to 3 inclusive.

When the gripping force applied to the upper and lower handles 1 and 9 is removed therefrom, the above-mentioned spring 24 and also spring 13 recoil to cause the lower handle 9 to pivot about the pin 10 in the clockwise direction as seen in FIGS. 1 to 3 inclusive which in turn causes the connector rod 21 to pivot about the pin 22 in the counter-clockwise direction to thereby move the pin 23 of the upper end of the rod leftwards within the slot 20. Reference numeral 26 denotes an upper cutting blade holder having an upper cutting blade support portion 27 for holding the upper cutting blade 30 at the leading end and received in the guide opening 14 in parallel with the guide member 15. The upper cutting blade holder 26 has an elongated slot 28 in substantially the central portion thereof for loosely receiving the above-mentioned bolt 16 and also a through bore 29 in the rear portion for pivotably receiving the above-mentioned pin 23. Thus, the upper cutting blade holder 26 is also pivotably connected to the upper handle 1 and further pivotably connected at the rear end to the lower handle 9 by means of the connector rod 21. The upper cutting blade support portion 27 is positioned behind the holding portion 17 and projects laterally of the surfaces 1' and 9' of the upper and lower handles 1 and 9 in the same direction as the holding portion 17. The front surface 27' of the blade support portion 27 has the upper cutting blade 30 secured thereto in opposition to the lower cutting blade 4 and the upper blade 30 cuts into the insulating covering on the electrical wire together with the lower cutting blade 4. Like the lower cutting blade 4, the upper cutting blade 30 projects laterally of the surfaces 1' and 9' of the upper and lower handles 1 and 9. A portion of the cutting blade 30 on one side thereof is provided with a plurality of arcuate blade edges 31 which correspond in number to and is aligned with the blade edges 7 on the lower cutting blade 4. Thus, the edges 31 are complementary to the cutting edges 7. Another portion of the cutting blade 30 on the other or opposite side thereof is provided with an elongated blade edge 32 which is complementary to and in alignment with the edge 8 on the lower cutting blade 4. Reference numeral 33 denotes an insulating covering stripping member which is adapted to abut against the end surface of the insulating covering on the electrical wire where the lower cutting blade 4 has cut and move together with the upper cutting blade 30 in parallel to the longitudinal direction of the upper and lower handles 1 and 9 to thereby aid the stripping of the insulating covering. The stripping member 33 has a stripping portion 34 at the leading end and a slot 35 in the rear portion and is positioned between the guide member 15 and the upper cutting blade holder 26 within the guide opening 14. Like the upper cutting blade holder 26, the stripping member 33 is also provided in substantially the central portion thereof with a slot 36. The bolt 16 extends loosely through the slot 36 to pivotably connect the member 33 to the upper handle 1 and the pin 33 extends loosely through the rear slot 35 to pivotably connect the member 33 to the central portion of the lower handle 9 through the connector rod 21. And as more clearly shown in FIG. 5, the stripping member 33 projects laterally of the surfaces 1' and 9' of the upper and lower handles 1, 9 behind the lower cutting blade 4 in the same direction as the lower holding portion 3. In the initial stage of the stripping operation, the leading end of the stripping portion 34 of the stripping member 33 is in engagement with the inner side of the lower cutting blade 4. If necessary or desired, a stripping blade 37 may be attached to the stripping portion 34 projecting laterally of the surfaces 1' and 9' of the upper and lower handles 1 and 9 like the lower cutting blade 4. The blade edge of the stripping blade 37 extends parallel to the lower cutting blade 4 and has a configuration corresponding to the blade edges 7 and 8 so as to cut into the insulating covering of the electrical wire in cooperation with the blade edges 7 and 8.

With the above-described construction and arrangement of the components of the tool, in operation, a covered electrical wire from which the sheath or covering is to be removed such as a flattened covered electrical wire is passed into the space between the guides 5 from the front thereof or from one side of the guides with the axis of the wire extending in the longitudinal direction of the handles 1 and 9 in the position of the tool as shown in FIG. 1 wherein the lower handle 9 is in its fully open position. As the covered wire is passed between the guides 5, a particular or predetermined area of the wire is positioned on the blade edge 8 of the lower cutting blade 4. Then, the operator grips the upper and lower handles 1 and 9 to pivot the lower handle 9 about the pin 10 in the counter-clockwise direction (as seen in FIG. 1) against the force of the spring 13. The pivotal movement of the lower handle 9 in the counter-clockwise direction raises the connector rod 21 pivoted to the lower handle 9 by the counter-clockwise spring force of the spring 24 and the rising connector rod 21 pushes upwardly the rear portion of the guide member 15 by means of the pin 23 at the upper end of the rod 21. Thus, the guide member 15 pivots about the bolt 16 in the counter-clockwise direction as seen in FIG. 1 and the upper holding portion 17 moves downwardly toward the lower holding portion 3 on the upper handle 1 to grip the covered wire between the anti-slip member 38 on the undersurface of the upper holding portion 17 and the lower holding portion 3. Simultaneously with the upward movement of the connector rod 21, the rear portion of the upper cutting blade holder 26 is also pushed up by the pin 23 to pivot about the bolt 16 in the counter-clockwise direction as seen in FIG. 1 to thereby move the upper cutting blade 30 supported by the upper blade support portion 27 downwardly toward the lower cutting blade 4 on the lower holding portion 3. On the other hand, since the slot 35 in the rear portion of the stripping member 33 extends in the same direction as the pin 23 moves upwardly and thus, since the pin 23 moves upwardly along the slot 35, no pivotal movement of the stripping member 33 will occur whereby the stripping-off portion 34 is held in contact with the lower holding portion 3 with the stripping blade 37 disposed adjacent to the lower cutting blade 4. When the lower handle 9 is moved upwardly in the manner described above, the upper blade 30 is caused to be pressed against the flattened covered wire positioned on the lower cutting blade 4, the upper ends of the guides 5 enter the corresponding recesses 19 in the undersurface 17' of the holding portion 17, the blade edges 8 and 32 of the lower and upper cutting blades 4 and 30, respectively, cut into the insulating covering on the covered electrical wire and at the same time, the anti-slip member 38 provided on the undersurface of the upper holding portion 17 along the forward surface of the upper blade 30 and the stripping blade 37 positioned adjacent to the inner side of the lower cutting blade 4 also cut into the insulating covering. When a cut has been made in the insulating covering to a predetermined depth, the lower end of the stop member 18 on the guide member 15 caused to abut against the upper surface 3' of the lower holding portion 3 on the upper handle 1 as shown in FIG. 2 to terminate the pivotal movement of the guide member 15 and the upper cutting blade holder 26. In this condition of the tool, the slot 20 in the guide member 15, the slot 28 in the upper cutting blade holder 26 and the slot 36 in the stripping member 33 are disposed in parallel to each other in the longitudinal direction of the upper handle 1. Thereafter, as the lower handle 9 is further pivoted upwardly, the lower end of the connector rod 21 is also moved upwardly, because the lower end of the rod is pivoted to the lower handle 9 by the stub shaft 22. However, since the upper end of the connector rod 21 is connected to the guide member 15 which is now stationary by means of the pin 23 engaging in the guide member slot 20, the pin 23 moves rightwards as seen in FIGS. 1 to 3 inclusive along the slot 20 as the connector rod 21 moves upwardly. Thus, the connector rod 21 pivots about the stub shaft 22 in the clockwise direction as seen in FIGS. 1 to 3 inclusive against the force of the spring 24. The rightward movement of the pin 23 along the slot 20 causes the upper cutting blade holder 26 pivoted in the rear portion to the pin 23 to move rightwards as seen in FIGS. 1 to 3 inclusive under the guidance of the bolt 16 loosely received in the slot 28 formed in the central portion of the holder 26 and at the same time, the stripping member 33 having the pin 23 received loosely in the slot 35 also moves rightwards as seen in FIGS. 1 to 3 inclusive under the guidance of the bolt 16 received loosely in the slot 36 in the central portion of the member 33 together with the upper cutting blade holder 26 parallel to the latter. This movement of the members 26 33 causes the upper cutting blade 30 and stripping blade 37 which have cut into the insulating covering on the covered electrical wire to move simultaneously and parallel to each other in the axial direction of the flattened covered electrical wire which extends in the longitudinal direction of the upper and lower handles 1 and 9 to assume the position as shown in FIG. 3. At this time, since the covered electrical wire is gripped by the wire holding mechanism comprised of the holding portions 3 and 17 and further since the cut end edge formed on the insulator coating thereof is restrained by the anti-slip member 38 and the lower blade 4, as the upper cutting blade 30 and stripping blade 37 move so as to pull the cut insulating covering off of the wire core toward the rear portions of the handles, the displacement of the cut end is prevented and the covered electrical wire can be positively stripped of the insulating covering from the cut end edge. Thereafter, when the gripping force applied to the handles 1 and 9 is released the above-described sequence of operations is reversed, that is, first of all, the lower handle 9 is caused to pivot downwardly in the clockwise direction as seen in FIGS. 1 to 3 inclusive under the force of the springs 13 and 24 and the connector rod 21 is also caused to pivot downwardly in the counter-clockwise direction as seen in FIGS. 1 to 3 inclusive under the force of the spring 24 whereby the upper cutting blade holder 26 holding the upper cutting blade 30 thereon and the stripping-off blade holder 33 holding the stripping blade 37 thereon simultaneously move leftwards as seen in FIGS. 1 to 3 inclusive in parallel to each other to the position as shown in FIG. 2. As the lower handle 9 further continues to pivot downwardly, the connector rod 21 also pivots downwardly, and the guide member 15 and upper cutting blade holder 26 pivot downwardly in the clockwise direction to the position as shown in FIG. 1 whereby the flattened covered electrical wire from which the insulating covering has been removed is released to thereby complete the stripping operation. When a covered solid wire is subjected to the stripping treatment, the wire is positioned on the arcuate blade edge 7 of the lower cutting blade 4 in the same manner as described in connection with the insulator coating stripping-off treatment on the flattened covered electrical wire and the lower handle 9 is gripped to be pivoted upwardly toward the upper handle 1, the blade edge 7 of the lower cutting blade 4, the blade edge 31 of the upper cutting blade 30 and the stripping-off blade 37 cut into the insulating covering on the covered solid wire to a predetermined depth and the upper blade 30 and stripping blade 37 move along the core wire whereby the insulator coating is pulled off the core wire.

As is clear from the foregoing, according to the present invention, by placing a covered electrical wire from which the insulating covering is to be removed onto the holding portion of the lower jaw and then gripping the lower handle to cause the handle to pivot upwardly, the insulating covering stripping operation is performed in the axial direction of the wire and thus, the stripping can be efficiently performed even in a limited space. And since the upper and lower cutting blades project laterally of the side surfaces of the upper and lower handles, the electrical wire positioned between the upper and lower cutting blades will not impede the movement of the handles, the lower cutting blade can be positioned in any desired position along the wire to thereby ensure positive stripping of the insulator coating covering a substantial distance in the longitudinal direction of the wire. Furthermore, during the stripping of the insulator coating, since the anti-slip member and lower cutting blade abut against the cut end edge on the insulator coating, the wire is held against movement and displacement to thereby ensure positive cut off of the insulating covering from a precise position thereon. And since the lower cutting blade is secured to the lower jaw which is integral with the leading end of one of the handles and does not move during the stripping operation, the construction of the tool can be made simple and rigid. Furthermore, since the guide member, upper cutting blade holding portion and stripping member are mounted on the handle by the common shaft and operated by the common connector rod, the operation mechanism of the tool is simple and compact and can be operated in a simple manner. Furthermore, since the complementary arcuate blade edges are provided on the opposing upper and lower cutting blades in adjacent opposing upper and lower cutting blades in adjacent opposing relationship for stripping a flattened covered electrical wire of the insulator coating, the insulating covering can be stripped off of a flattened covered electrical wire comprising a plurality of covered wires as well as a covered solid wire.

While only one embodiment of the invention has been shown and described in detail, it will be understood that the same is for illustration only and not to be taken as a definition of the invention, reference being had for this purpose to the appended claims.

What is claimed is:

1. A tool for stripping the insulating covering from a covered electrical wire which comprises a main body consisting of a first handle having a lower jaw at the leading end and a second handle pivoted to said first handle by means of a shaft, a wire holding mechanism provided at the leading end portion of said main body for gripping said wire when the first and second handles are closed and cutting blade means provided at the leading end portion of said main body adjacent to said wire holding mechanism for cutting into said insulating covering and pulling the cut insulating covering off of wire core along said handles when said first and second handles are closed, said cutting blade means having an upper cutting blade and a lower cutting blade, said lower cutting blade being a stationary cutting blade secured to the upper surface of said lower jaw and said upper cutting blade being a movable cutting blade adapted to approach the lower cutting blade and move in the longitudinal direction of the handles when the first and second handles are closed, said wire holding mechanism and cutting blade means projecting laterally of said handles.

2. The tool as set forth in claim 1, in which said upper and lower cutting blades project laterally of said first and second handles.

3. The tool as set forth in claim 1, in which said upper and lower cutting blades are provided with groove-shaped blade edges for receiving a flattened covered electrical wire and arcuate blade edges for receiving a covered solid wire in adjacent relationship to each other and guides are provided adjacent to each of said blade edges for guiding said wire.

4. The tool as set forth in claim 1, said cutting blade means further including a stripping member adapted to cut into the underside of said insulating covering and pull the cut insulating covering off of said wire core in the longitudinal direction of said handles when the handles are closed.

5. The tool as set forth in claim 1, in which said wire holding mechanism comprises a lower holding portion formed on said lower jaw and an upper holding portion pivoted to said first handle and movable toward said lower holding portion as said handles are closed, the undersurface of said upper holding portion having an anti-slip member attached thereto extending along the front surface of said upper cutting blade so as to abut against the cut end edge of said insulating covering left on the wire core when the insulating covering is cut.

6. A tool for stripping the insulating covering from a covered electrical wire which comprises a main body consisting of a first handle having a lower jaw at the leading end and a second handle pivoted to said first handle by means of a shaft, a wire holding mechanism provided at the leading end portion of said main body for gripping said wire when the first and second handles are closed and cutting blade means provided at the leading end portion of said main body adjacent to said wire holding mechanism for cutting into said insulating covering and pulling the cut insulating covering off of wire core along said handles when said first and second handles are closed, said wire holding mechanism and cutting blade means projecting laterally of said handles, the cutting blade means having an upper cutting blade and a lower cutting blade, said lower cutting blade being a stationary cutting blade provided on the upper surface of said lower jaw, an upper cutting blade holder supported in the intermediate portion of said first handle for pivotal and axial movement relative to the first handle, said upper cutting blade being a movable cutting blade attached to the leading end of said upper cutting blade holder, a connector rod having the rear end of said upper cutting blade holder pivoted to one end thereof and having the other end pivoted to said leading end portion of the second handle, and said wire holding mechanism having an upper holding portion and a lower holding portion positioned in front of said upper and lower cutting blades, said lower holding portion being formed on the upper surface of said lower jaw, a guide member pivoted at the intermediate portion of said first handle and pivoted at the rear end at said one end of the connector rod for pivotal and axial movement relative to the first handle, said upper holding portion being formed on the undersurface of the leading end of said guide member and a spring biasing said connector rod in the counter-clockwise direction.

7. The tool as set forth in claim 6 in which said first handle has a guide opening in substantially the central portion thereof, said upper cutting blade holder and said guide member being received in said guide opening, and a common shaft supporting said upper cutting blade holder and said guide member on said first handle.

8. The tool as set forth in claim 7, in which said upper cutting blade holder has an axial slot in the intermediate portion through which said common shaft extends loosely and said guide member has a slot at the rear end to which said one end of the connector rod is connected for pivotal and axial movement relative to the rod.

9. The tool as set forth in claim 8, further comprising a stripping member pivoted at the intermediate portion thereof to said handle by said common shaft and being received in said guide opening, and said stripping member having an axial slot in the intermediate portion thereof in which said common shaft is received loosely, said stripping member having at the leading end a stripping portion including a stripping blade projecting upwardly along the back side of said lower cutting blade and having at the rear end a slot substantially normal to the axis of the handles for connecting said one end of the connector rod to the stripping member for pivotal and up and down movement of said one end of said connector rod.

* * * * *